(12) United States Patent
Li et al.

(10) Patent No.: US 10,784,717 B2
(45) Date of Patent: Sep. 22, 2020

(54) METHOD, DEVICE, AND SYSTEM FOR CONTROLLING POWER SUPPLY

(71) Applicant: Delta Electronics (Shanghai) CO., LTD, Shanghai (CN)

(72) Inventors: Linchun Li, Shanghai (CN); Dezhi Jiao, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 451 days.

(21) Appl. No.: 15/581,129

(22) Filed: Apr. 28, 2017

(65) Prior Publication Data
US 2017/0346337 A1    Nov. 30, 2017

(30) Foreign Application Priority Data

May 26, 2016    (CN) .......................... 2016 1 0361956

(51) Int. Cl.
*G05B 13/02*     (2006.01)
*H02J 13/00*     (2006.01)

(52) U.S. Cl.
CPC ...... *H02J 13/0062* (2013.01); *G05B 13/0265* (2013.01)

(58) Field of Classification Search
None
See application file for complete search history.

(56) References Cited

U.S. PATENT DOCUMENTS

| 8,493,046 B2 | 7/2013 | Kurokawa et al. |
| 8,538,709 B2 | 9/2013 | Kawase |
| 8,654,553 B1* | 2/2014 | Ye ....................... H02M 1/4208 323/207 |
| 2011/0022826 A1* | 1/2011 | More ....................... G06F 1/26 713/1 |

(Continued)

FOREIGN PATENT DOCUMENTS

| CN | 1329391 A | 1/2002 |
| CN | 101286702 A | 10/2008 |

(Continued)

OTHER PUBLICATIONS

The CN1OA issued Feb. 11, 2019 by the CNIPA.

*Primary Examiner* — Kenneth M Lo
*Assistant Examiner* — Istiaque Ahmed
(74) *Attorney, Agent, or Firm* — Yunling Ren

(57) ABSTRACT

A method for controlling a power supply includes: acquiring working state information of the power supply in a current operation; determining whether a state value of the power supply in the current operation satisfies a preset condition according to the working state information; setting a first control strategy for controlling the current operation of the power supply as a second control strategy when the preset condition is satisfied; storing the state value in the current operation and the first control strategy of the power supply in the current operation when the preset condition is not satisfied, and modifying the first control strategy to obtain the second control strategy according to an adjustment (Continued)

strategy; and loading the second control strategy from the machine-learning control circuitry in next operation, and controlling the next operation of the power supply according to the second control strategy.

20 Claims, 10 Drawing Sheets

(56) References Cited

U.S. PATENT DOCUMENTS

| | | | | |
|---|---|---|---|---|
| 2013/0117589 A1* | 5/2013 | Satyamoorthy | ......... | G06F 1/324 713/320 |
| 2013/0169350 A1* | 7/2013 | Whatmough | .......... | G01R 31/30 327/530 |
| 2018/0226809 A1* | 8/2018 | Yang | ................ | H02M 3/33507 |

FOREIGN PATENT DOCUMENTS

| | | |
|---|---|---|
| CN | 101681150 A | 3/2010 |
| CN | 102882238 A | 1/2013 |
| CN | 103296940 A | 9/2013 |
| CN | 103997219 A | 8/2014 |
| CN | 104052255 A | 9/2014 |
| CN | 104656735 A | 5/2015 |

* cited by examiner

METHOD, DEVICE, AND SYSTEM FOR CONTROLLING POWER SUPPLY

CROSS-REFERENCE TO RELATED APPLICATIONS

This application is based upon and claims priority to Chinese Patent Application No. 201610361956.3, filed May 26, 2016, the entire contents of which are incorporated herein by reference.

TECHNICAL FIELD

The present disclosure generally relates to the technical field of power supplies, and more particularly, to a method, a device, and a system for controlling a power supply.

BACKGROUND

Requirements on performance of power supply products become higher and higher with the rapid development of medical treatment, communication, aerospace and so on, traditional control theories and simplex control methods have been unable to satisfy the control requirements on system. Inherent differences in components used by the power supply products and drift of the components over time will cause differences in the performance of the power supply products under the simplex control methods. In addition, due to differences in aspects such as manufacture, installation and environment, fixed control methods or control parameters cannot be applicable to every use condition.

FIG. 1 is a schematic diagram illustrating a conventional circuit for controlling a power supply. A circuit 101 serves as a main circuit of the power supply, such as an LLC resonance circuit, a Power Factor Correction (PFC) circuit. A control circuitry 102 controls start-up, operation, shutdown and protection of the power supply by acquiring input and output signals of the power supply according to a fixed control strategy. Such a control method has a simple structure and is easy to be implemented. However, the control method needs to completely cover various inputs and load states in the operation of the power supply during designing, and also needs to appropriately design the control methods and control parameters under consideration of the environment of the power supply, tolerances in the components, aging of the product and so on. Moreover, once the product is finished, it cannot be changed at the client side. Therefore, developers are required to take precise considerations of future usage scenarios, inherent performance of the product, the tolerance, aging state and so on.

SUMMARY

The objective of the present disclosure is to provide a method, a device, and a system for controlling a power supply, so as to overcome, at least to a certain degree, one or more problems resulting from limitations and defects of related technologies.

Other features and advantages of the present disclosure will become apparent from the following detailed description, or may be partly learned by the practice of the present disclosure.

According to a first aspect of the present disclosure, there is provided a method for controlling a power supply, which includes an execution control circuitry and a machine-learning control circuitry. The method includes: acquiring, by the machine-learning control circuitry, working state information of the power supply in a current operation; determining whether a state value of the power supply in the current operation satisfies a preset condition according to the working state information; setting a first control strategy for controlling the current operation of the power supply as a second control strategy when the preset condition is satisfied; storing the state value in the current operation and the first control strategy of the power supply in the current operation when the preset condition is not satisfied, and modifying the first control strategy to obtain the second control strategy according to an adjustment strategy; and loading, by the execution control circuitry, the second control strategy from the machine-learning control circuitry in next operation, and controlling, by the execution control circuitry, the next operation of the power supply according to the second control strategy.

In an exemplary embodiment of the present disclosure, the method further includes: acquiring, by the execution control circuitry, control information for controlling the current operation of the power supply; and determining whether the state value of the power supply in the current operation satisfies the preset condition according to the working state information and the control information.

In an exemplary embodiment of the present disclosure, the first control strategy includes at least one control strategy and the adjustment strategy corresponds to each of the at least one control strategy.

In an exemplary embodiment of the present disclosure, the modifying the first control strategy to obtain the second control strategy according to an adjustment strategy includes: comparing the preset condition with the state value in the current operation, wherein the state value in the current operation including at least one parameter, retrieving a parameter of the state value in the current operation differing from the preset condition, and determining a corresponding adjustment strategy based on the parameter differing from the preset condition; and modifying the first control strategy to obtain the second control strategy according to contents of the corresponding adjustment strategy.

In an exemplary embodiment of the present disclosure, the modifying the first control strategy for controlling the current operation of the power supply according to the contents of the corresponding adjustment strategy includes: determining, according to an analysis modification condition in the corresponding adjustment strategy, an analysis process under the analysis modification condition and adjustment action information derived from a corresponding analysis result; and modifying the first control strategy for controlling the current operation of the power supply according to the adjustment action information.

In an exemplary embodiment of the present disclosure, the first control strategy includes at least one of the following: a power supply start-up control strategy, a power supply operation control strategy, a temperature control strategy and a protection control strategy.

In an exemplary embodiment of the present disclosure, the method includes: modifying at least one of the adjustment strategy and the preset condition by means of communication or via sampling of external signal.

In an exemplary embodiment of the present disclosure, the working state information includes at least one of input signal and output signal of the power supply.

In an exemplary embodiment of the present disclosure, the control information includes at least one of the following: a preset operation parameter, a driving signal change information over time, change information of the power supply state and protection information.

In an exemplary embodiment of the present disclosure, prior to the current operation of the power supply, the method includes: determining whether the current operation of the power supply is the first time; loading, by the execution control circuitry, a default control strategy as the first control strategy for controlling the current operation of the power supply when the current operation is the first time, and controlling the current operation of the power supply according to the first control strategy; and loading, by the execution control circuitry, the second control strategy in a previous operation from the machine-learning control circuitry as the first control strategy for controlling the current operation of the power supply when the current operation is not first time, and controlling the current operation of the power supply according to the first control strategy.

According to a second aspect of the present disclosure, there is provided a device for controlling a power supply, including: a machine-learning control circuitry including an acquisition circuitry configured to acquire working state information of the power supply in a current operation; a first determination circuitry connected to the acquisition circuitry and configured to determine whether a state value of the power supply in the current operation satisfies a preset condition according to the working state information; a strategy modification circuitry connected to the first acquisition circuitry and configured to, when the first determination circuitry determines that the preset condition is satisfied, set a first control strategy for controlling the current operation of the power supply as a second control strategy and, when the first determination circuitry determines that the preset condition is not satisfied, enable a storage circuitry to store the state value in the current operation and the first control strategy of the power supply in the current operation, and then modify the first control strategy to obtain the second control strategy according to an adjustment strategy; the storage circuitry configured to store the state value in the current operation and the first control strategy of the power supply in the current operation; and an execution control circuitry connected to the strategy modification circuitry and configured to control the current operation of the power supply according to the first control strategy, receive and store the second control strategy from the machine-learning control circuitry in next operation of the power supply, and control the next operation of the power supply according to the second control strategy.

In an exemplary embodiment of the present disclosure, the acquisition circuitry is further configured to acquire control information for controlling the current operation of the power supply, the first determination circuitry is further configured to determine whether the state value of the power supply in the current operation satisfies the preset condition according to the working state information and the control information, and the control information includes at least one of the following: a preset operation parameter, a driving signal change information over time, change information of the power supply state and protection information.

In an exemplary embodiment of the present disclosure, at least one adjustment strategy is stored in the strategy modification circuitry, the first control strategy includes at least one control strategy, and the at least one adjustment strategy corresponds to the at least one control strategy.

In an exemplary embodiment of the present disclosure, the strategy modification circuitry includes: an adjustment strategy determination sub-circuitry, configured to compare the preset condition with the state value in the current operation including at least one parameter, retrieve a parameter of the state value in the current operation differing from the preset condition, and determine the adjustment strategy based on the parameter differing from the preset condition.

In an exemplary embodiment of the present disclosure, the adjustment strategy include at least an analysis modification condition, an analysis process under the analysis modification condition and adjustment action information derived from a corresponding analysis result.

In an exemplary embodiment of the present disclosure, the strategy modification circuitry is further configured to modify the first control strategy for controlling the current operation of the power supply according to the determined adjustment strategy.

In an exemplary embodiment of the present disclosure, the first control strategy includes at least one of the following: a power supply start-up control strategy, a power supply operation control strategy, a temperature control strategy and a protection strategy.

In an exemplary embodiment of the present disclosure, the working state information includes at least one of input signal and output signal of the power supply.

In an exemplary embodiment of the present disclosure, the device further includes: a second determination circuitry, connected to the execution control circuitry and configured to determine whether the current operation of the power supply is the first time, notify the execution control circuitry to load a default control strategy as the first control strategy for controlling the current operation of the power supply when the current operation is the first time, and notify the execution control circuitry to load a second control strategy in a previous operation from the machine-learning control circuitry as the first control strategy for controlling the current operation of the power supply when the current operation is not the first time operation, such that the execution control circuitry controls the current operation of the power supply according to the first control strategy.

According to a third aspect of the present disclosure, there is provided a power supply control system including the device for controlling a power supply described in any of the above-mentioned exemplary embodiments.

According to the power supply control method, the power supply control device, and the power supply control system provided by the exemplary embodiments of the present disclosure, it is determined whether a current operation state is within a desired output range by sampling feedback signal of a current operation of the power supply and control information of a control circuitry. When the current operation state is not within the desired output range, a control strategy can be modified according to an adjustment strategy, and an improved control strategy is generated and fed back to the control circuitry. In this way, the control strategy of the power supply can be dynamically adjusted. After a complete learning process, an output of the power supply can be always maintained within the desired range. Such a control manner has flexibility and strong applicability. A suitable control parameter can be determined through automatic optimization of the power supply without manual preset. When there is a tolerance occurring in parameters of the power supply, an optimal operation parameter can be automatically determined. Moreover, in use of the power supply, such control manner may keep optimizing the control parameter through a continuous monitoring, so as to compensate parameter drifts of some components of the power supply in long-term work.

BRIEF DESCRIPTION OF THE DRAWINGS

The above and other features and advantages of the present disclosure will become more apparent by describing exemplary embodiments of the present disclosure in detail with reference to the accompanying drawings.

DETAILED DESCRIPTION

The exemplary implementations will now be described more fully with reference to the accompanying drawings. However, the exemplary implementations may be implemented in various forms and should not be understood as being limited to the implementations set forth herein; rather, these implementations are provided so that this disclosure will be thorough and complete, and will fully convey the conception of exemplary implementations to those skilled in the art.

In addition, the features, structures or characteristics described herein can be combined in one or more embodiments in any appropriate way. In the description hereinafter, many specific details are provided for fully understanding of the embodiments of the present disclosure. However, it will be appreciated by those skilled in the art that the technical solution of the present disclosure can be practiced without one or more of the specific details, or with other methods, components, materials, etc. In addition, known structures, materials or operations will not be illustrated or described in detail, to avoid obscuration of the aspects of the present disclosure.

Figure 1:
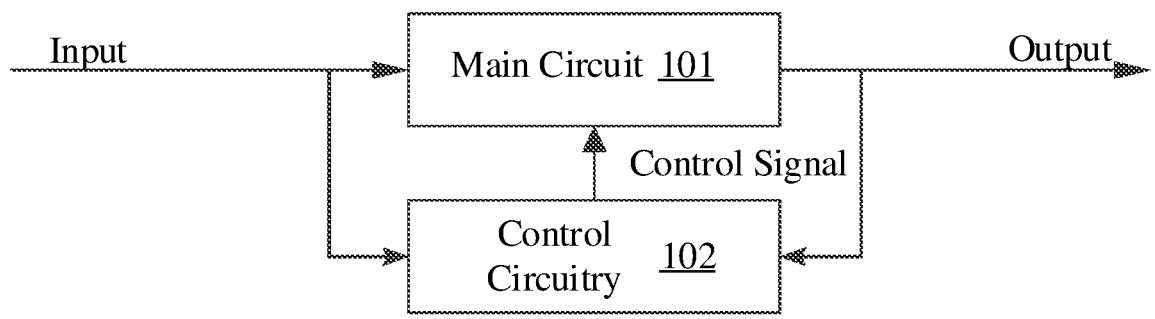
FIG. 1 is a block diagram illustrating a power supply control circuit in related art.
Figure 2A:
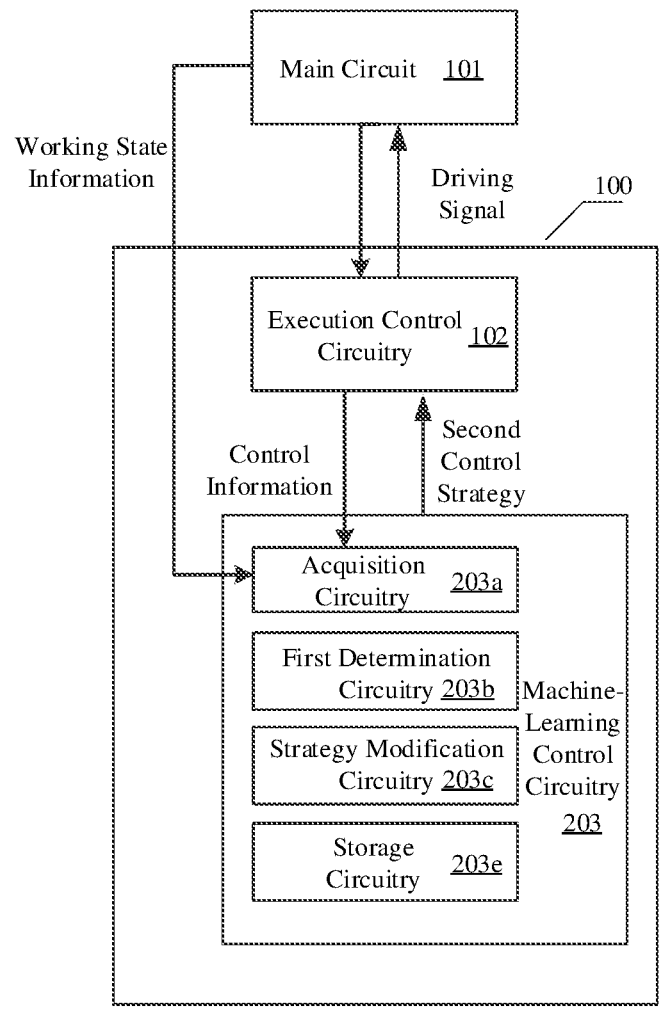
FIG. 2A is a block diagram illustrating a power supply control device according to an exemplary embodiment of the present disclosure.

As shown in FIG. 2A, the present exemplary embodiment discloses a power supply control device 100 which includes a machine-learning control circuitry 203 and an execution control circuitry 102. The machine-learning control circuitry 203 includes an acquisition circuitry 203a, a first determination circuitry 203b, a strategy modification circuitry 203c, and a storage circuitry 203e.

The acquisition circuitry 203a is configured to acquire working state information of the power supply in a current operation. In an embodiment, the current operation refers to a process from start-up of the power supply to shutdown of the power supply this time. A next operation of the power supply refers to a process from start-up of the power supply to shutdown of the power supply next time. The working state information mainly includes one or more of an input signal, an output signal, a driving frequency, a duty ratio and the like of the main circuit 101. In an embodiment, the acquisition circuitry 203a is further configured to acquire control information for controlling the current operation of the power supply. The control information is control data of the power supply during the operation, and is recorded by the execution control circuitry 102, and then transmitted to the acquisition circuitry 203a at the end of the operation. The control information mainly includes any one or more of: a preset operation parameter, such as voltage reference signals and current reference signals, and operation time; change information of the power supply state, for example, switching of states among such as a soft start-up state, a ready state, a stable operation state, an off state; and protection information, such as a protection type, event time.

The first determination circuitry 203b is connected to the acquisition circuitry 203a, and configured to determine whether a state value of the power supply in the current operation satisfies a preset condition according to the working state information and the control information, and transmit a determination result to the strategy modification circuitry 203c. In an embodiment, the preset condition may be an operation state value range of the power supply in a desired operation state with fixed input and load. The operation state value includes at one or more parameters. The operation state value range may be a change range of the one or more parameters of the power supply in one operation, for example, a change range of performance indexes such as a rise time, an overshoot, a ripple, output precision, and a key device temperature. The operation state value range may also be a change range of the one or more parameters under a certain condition, for example, 25%-30% of steady state output voltage needs to be reached in 0.5 ms after start-up of the power supply, and a frequency of a PWM (Pulse Width Modulate) control signal cannot go beyond 250 kHz.

The strategy modification circuitry 203c is connected to the first determination circuitry 203b, and configured to, if a determination result of the first determination circuitry 203b indicates that the preset condition is satisfied, set a first control strategy for controlling the current operation of the power supply as a second control strategy, and if the determination result of the first determination circuitry 203b indicates that the preset condition is not satisfied, enable the storage circuitry 203e to store the state value in the current operation and the first control strategy of the power supply in the current operation, and then modify the first control strategy to obtain a second control strategy according to an adjustment strategy.

The strategy modification circuitry 203c is stored with at least one adjustment strategy, and content of each adjustment strategy includes at least an analysis modification condition, an analysis process under the analysis modification condition and adjustment action information derived from a corresponding analysis result.

The first control strategy includes one or more of the following: a power supply start-up control strategy, a power supply operation control strategy, a temperature control strategy and a protection control strategy. For each of the above control strategies, the strategy modification circuitry 203c stores an adjustment strategy corresponding thereto. Thus, when a timing for making modification under a certain condition is arrived, an analysis process is performed, and then a corresponding adjustment action is performed after determination of an analysis result.

The power supply start-up control strategy mainly includes any one or more of the following: a strategy for adjusting a rise time, a strategy for reducing the overshoot, a strategy for maintaining monotonicity of start-up and the like. According to an adjustment strategy corresponding to the power supply start-up control strategy, the start-up state continuously approaches a desired start-up range by comprehensively analyzing the control information and the working state information in start-up time, such as an output curve, and adjusting a control parameter such as a control signal, a start-up parameter, and reference parameter.

The power supply operation control strategy mainly includes any one or more of following: a strategy for loop control, a strategy for adjusting a sampling frequency, a strategy for setting an adjustment range of the control signal, a strategy for precision control and the like. According to an adjustment strategy corresponding to the power supply operation control strategy, the output signal is enabled to conform to a desired range by analyzing the control information and a feedback signal such as an input signal and an output signal during the operation, and adjusting parameters such as loop parameters, a reference proportion, the sampling frequency and the adjustment range of the control signal.

The temperature control strategy mainly includes one or more of the following: a strategy for heat dissipation control, a strategy for adjusting operation interval and the like. According to an adjustment strategy corresponding to the temperature control strategy, the power supply is enabled to operate in a desired temperature environment and performance thereof is maintained stable by adjusting parameters such as a fan rotation speed and the operation interval based on acquiring and analyzing a temperature signal corresponding to a key component in a system and a signal indicative of heat increased during the operation, and the like.

The protection control strategy mainly includes strategies for protecting voltage, current, temperature and periphery components. According to an adjustment strategy corresponding to the protection control strategy, the protection control strategy of the power supply is made accurate and effective by analyzing parameters such as a control parameter, operation time, an operation parameter when protection is started, and adjusting parameters such as a threshold value for protecting, prolonged time and hysteresis width.

The storage circuitry 203e is configured to store the state value in the current operation and the first control strategy of the power supply in the current operation.

The execution control circuitry 102 is connected to the strategy modification circuitry 203c, and configured to control the current operation of the power supply according to the first control strategy, receive and store a second control strategy from the strategy modification circuitry 203c in the next operation of the power supply, and control the next operation of the power supply according to the second control strategy.

Figure 3:
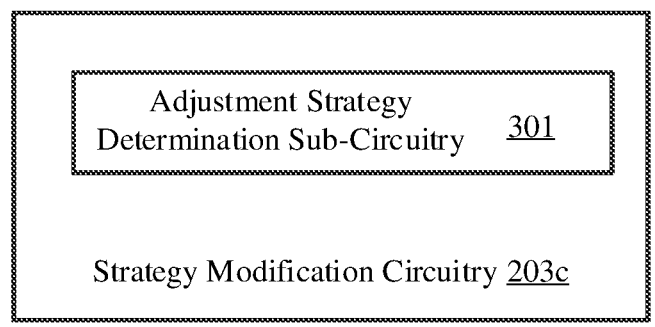
FIG. 3 is a block diagram illustrating a strategy modification circuitry in a power supply control device according to an exemplary embodiment of the present disclosure.

As shown in FIG. 3, the strategy modification circuitry 203c may include an adjustment strategy determination sub-circuitry 301 configured to compare the preset condition with the state value in the current operation, determine a difference therebetween, determine a control strategy that needs to be modified based on the difference, and then determine a corresponding adjustment strategy according to the control strategy that needs to be modified.

Since there are several control strategies, it is required to determine a control strategy that needs to be modified. In the present embodiment, the state value in the current operation is compared with the preset condition, and a parameter of the state value in the operation that differs from the preset condition is determined, thus one or several control strategies needing to be modified can be determined based on the parameter that differs from the preset condition. In this way, the strategy modification circuitry 203c modifies the first control strategy for controlling the current operation of the power supply according to contents of the corresponding adjustment strategy.

Figure 2B:
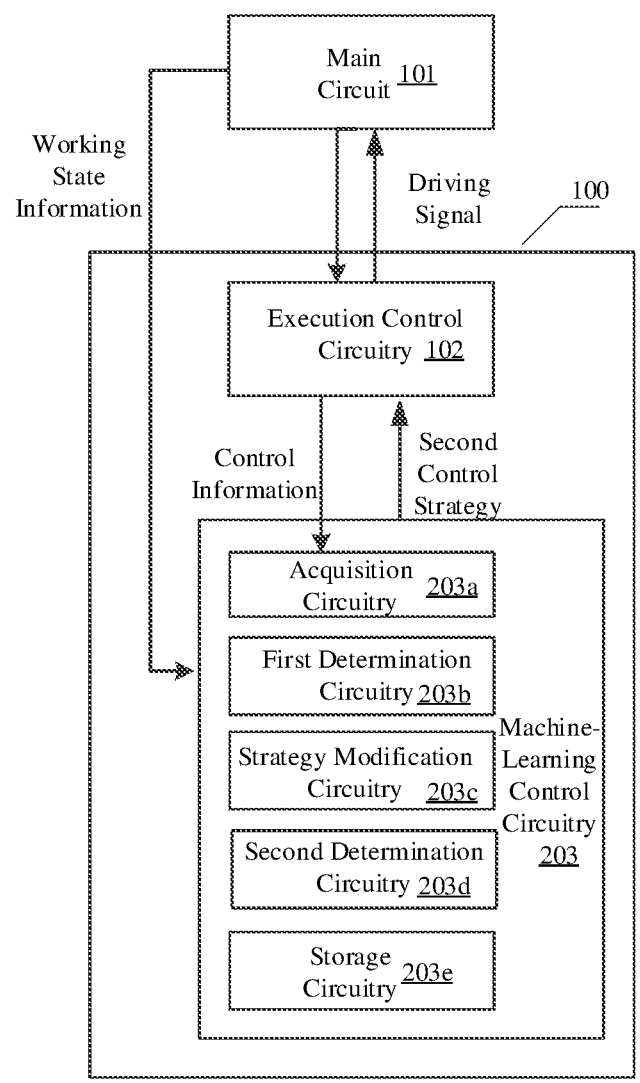
FIG. 2B is a block diagram illustrating a power supply control device according to an exemplary embodiment of the present disclosure.

Referring to FIG. 2B, in the present exemplary embodiment, the power supply control device 100 may further include a second determination circuitry 203d connected to the execution control circuitry 102, and configured to determine whether the current operation of the power supply is a first operation, if the current operation is the first operation, notify the execution control circuitry 102 to load a default control strategy as the first control strategy for controlling the current operation of the power supply, such that the execution control circuitry 102 controls the current operation of the power supply according to the first control strategy, and if the current operation is not the first operation, notify the execution control circuitry 102 to load a second control strategy in a previous operation from the machine-learning control circuitry as the first control strategy for controlling the current operation of the power supply, such that the execution control circuitry 102 controls the current operation of the power supply according to the first control strategy.

Thus, in FIGS. 2A and 2B, the operations of the main circuit 101 are basically the same as those of a power supply controlled in a conventional manner. A driving signal generated by the execution control circuitry 102 is directly used for controlling the main circuit 101. Except that the control strategy in the first operation of the execution control circuitry 102 is a default strategy, the remaining control strategies thereof are obtained from the machine-learning control circuitry 203. The machine-learning control circuitry 203 does not directly perform power supply control, and main functions of the machine-learning control circuitry 203 are to acquire working state information such as an input signal, an output signal during the operation of the power supply, store the working state information in a memory, and generate next improved control strategy according to information acquired during the current operation or information acquired during the current operation and the past operations, and transmit the improved control strategy to the execution control circuitry 102. This process may be referred to as a learning process. It is noted that for a power supply control system having higher requirements on outline dimension and hardware cost, when the machine-learning circuitry 203 obtains a stable control strategy through complete learning, such that the output may satisfy the desired range, the machine-learning circuitry 203 may be removed so as to simplify the power supply control system.

The embodiments of the present disclosure disclose a power supply control manner based on machine-learning conception. The control manner is simple, and may not only effectively solve the problems in the conventional control manner, but also solve the problem of complexity and time-consumption of intelligent control algorithms. The control manner may be applied to a power supply where a load state is known and load is stable during the operation.

Figure 4:
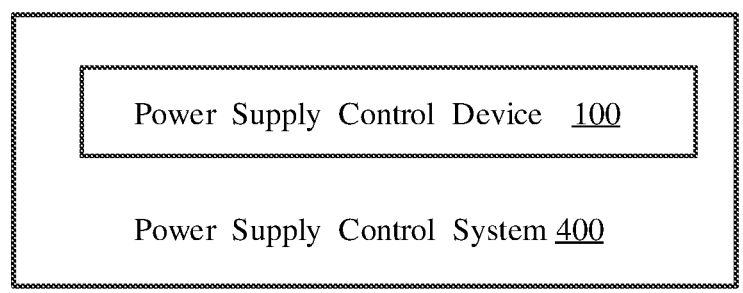
FIG. 4 is a block diagram illustrating a power supply control system according to an exemplary embodiment of the present disclosure.

As shown in FIG. 4, according to another exemplary embodiment of the present disclosure, there is further disclosed a power supply control system 100 including the power supply control device 400 described in any of the above-mentioned exemplary embodiments.

Figure 5:
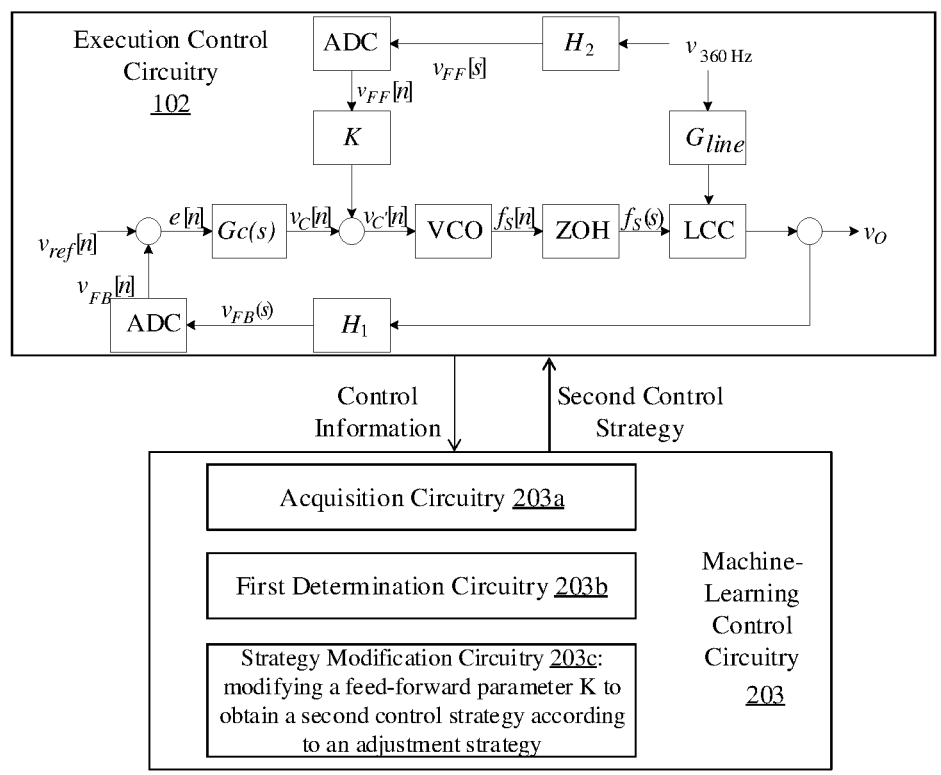
FIG. 5 is a block diagram illustrating a power supply control device according to an exemplary embodiment of the present disclosure.

As shown in FIG. 5, in the present exemplary embodiment, a preferable embodiment of the power supply control device 100 is disclosed. The execution control circuitry 102 includes an output voltage ripple control strategy, which has a control loop as illustrated in the control loop diagram corresponding to the execution control circuitry 102, wherein a parameter K is a feed-forward parameter. In the present embodiment, the voltage ripple control strategy is chosen as the first control strategy.

Hereinafter, specific procedures of an output voltage ripple control method performed in the machine-learning control circuitry in the present embodiment will be described with reference to FIG. 5. First of all, the acquisition circuitry 203a acquires working state information of the power supply in the current operation, such as an output voltage, and control information for controlling the current operation of the power supply. The control information includes: a preset parameter such as a voltage reference signal; a control signal such as a driving frequency in direct voltage loop control, and a variation of a driving frequency introduced by feed-forward; a power supply state change signal such as soft start-up end timing and feed-forward introduction timing; and historical protection information. In an embodiment, the direct voltage loop control refers to a control strategy when a fixed feed-forward parameter K=0 in the output ripple control strategy. The variation of driving frequency brought by the feed-forward is a variation of a driving frequency of the changed feed-forward parameter K relative to the driving frequency in the direct voltage loop control. Then, it is determined whether the state value of the power supply in the current operation reaches a preset condition according to the acquired working state information and control information. In the preset embodiment, the preset condition is that a ripple of the output voltage is less than or equal to 2 kV, or the variation of the driving frequency brought by feed-forward exceeds 3 kHz, or a monotonicity of the ripple of the output voltage changes over three times or a protection is started. If a determination result indicates that the state value in the current operation satisfies the preset condition, the first control strategy is directly used as the second control strategy. If the determination result indicates that the state value in the current operation does not satisfy the preset condition, the state value in the current operation and the corresponding first control strategy are stored, and then the first control strategy is modified to obtain the second control strategy. In an embodiment, the adjustment strategy determination sub-circuitry in the strategy modification circuitry compares the state value in the current operation with the preset condition and determines that a difference therebetween resides in the ripple of the output voltage, such that it is determined that the voltage ripple control strategy is used as the first control strategy in the current operation, and it is required to modify the first control strategy. An adjustment strategy corresponding to the output voltage ripple control strategy is that an analysis process is performed when an analysis modification condition, that the soft start-up ends and the feed-forward is completely added into a stable state loop control, is satisfied. When an analysis result indicates that the output voltage ripple is greater than 2.5 kV, and the output voltage ripple is less than the output voltage ripple under the adjustment strategy in the previous operation, an adjustment action is determined as that a value K_rh is added to the feed-forward parameter K. When the analysis result indicates that the output voltage ripple is greater than 2 kV and smaller than or equal to 2.5 kV, and the output voltage ripple is less than the output voltage ripple under the adjustment strategy in the previous operation, the adjustment action is determined as that a value K_rl is added to the feed-forward parameter K. When the analysis result indicates that the output voltage ripple is greater than 2 kV and smaller than or equal to 2.5 kV, and the output voltage ripple is larger than the output voltage ripple under the adjustment strategy in the previous operation, the adjustment action is determined as that a value K_f is subtracted from the feed-forward parameter K. The values K_rh, K_rl and K_f can be modified upon the modification of the adjustment strategy. Subsequently, the first control strategy is modified to obtain the second control strategy according to adjustment action information. The second control strategy is used for controlling next operation of the power supply. In an embodiment, a parameter in a transfer function Gc(s) in the voltage ripple control strategy can be modified according to the adjustment strategy to obtain the second control strategy.

Figure 6:
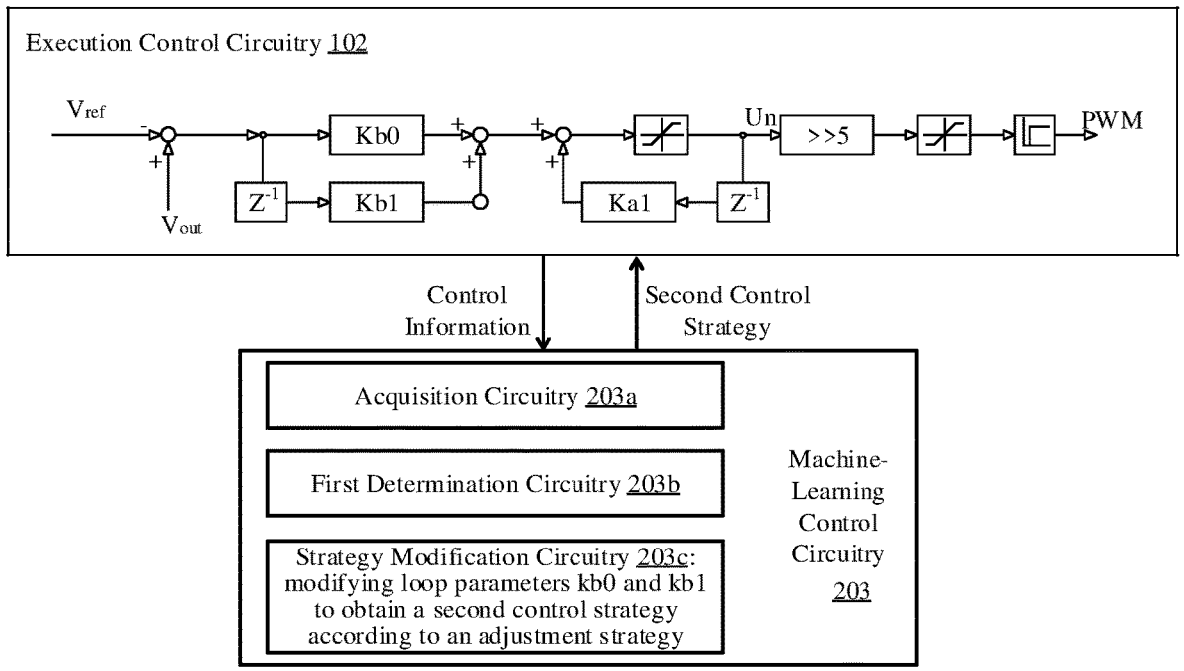
FIG. 6 is a block diagram illustrating a power supply control device according to an exemplary embodiment of the present disclosure.

As shown in FIG. 6, in the present exemplary embodiment, a preferable embodiment of the power supply control device 100 is disclosed. The execution control circuitry 102 includes an output voltage start-up control strategy, which has a control loop as illustrated in a control loop diagram corresponding to the execution control circuitry 102, wherein parameters Kb0 and Kb1 are loop parameters. In the present embodiment, the output voltage start-up control strategy is chosen as the first control strategy.

Hereinafter, specific procedures of an output voltage start-up control method performed in the machine-learning control circuitry in the present embodiment will be described with reference to FIG. 6. First of all, the acquisition circuitry 203a acquires working state information of the power supply during a current start-up, such as an output voltage, and control information for controlling the start-up of the current operation of the power supply. The control information includes a preset parameter such as a voltage reference signal, a control signal such as an output driving frequency, a steady state frequency, a power supply state change signal such as soft start-up end timing, and historical protection information. A direct voltage loop control refers to a control strategy when Kb0 and Kb1 in the voltage start-up control strategy are respectively initial values. Then, it is determined whether the state value of the power supply in the current start-up falls into a preset start-up state value range or satisfies an adjustment completion condition. In the present embodiment, the preset condition is that a voltage start-up process is monotonous and start-up time is less than or equal to 1.5 ms, or protection occurs, or a loop parameter goes beyond the range. If a determination result indicates that the state value in the current operation satisfies the preset condition, the first control strategy is directly used as the second control strategy. If the determination result indicates that the state value in the current operation does not satisfy the preset condition, the state value in the current operation and the corresponding first control strategy are stored, and then the first control strategy is modified to obtain the second control strategy. In an embodiment, the adjustment strategy determination sub-circuitry in the strategy modification circuitry compares the state value in the current operation with the preset condition and determines that a difference therebetween resides in voltage start-up time. Accordingly, it is determined that the voltage start-up control strategy is used as the first control strategy in the current operation, and it is required to modify the first control strategy. The adjustment strategy corresponding to the voltage start-up control strategy is that an analysis process is performed when an analysis modification condition that the adjustment is not the first time is satisfied. When an analysis result indicates that the start-up process is not monotonous, it is determined that an adjustment action is that a value GLOBAL_STEP is subtracted from both the parameters Kb0 and Kb1. When the analysis result indicates that the start-up process is monotonous and the start-up time is greater than 1.5 ms, it is determined that the adjustment action is that a value KB0_STEP is added to the parameter Kb0. The values GLOBAL_STEP and KB0_STEP can be modified upon the modification of the adjustment strategy. Then, the first control strategy is modified to obtain the second control strategy according to adjustment action information. The second control strategy is used for controlling next the start-up process of the next operation of the power supply.

Figure 7:
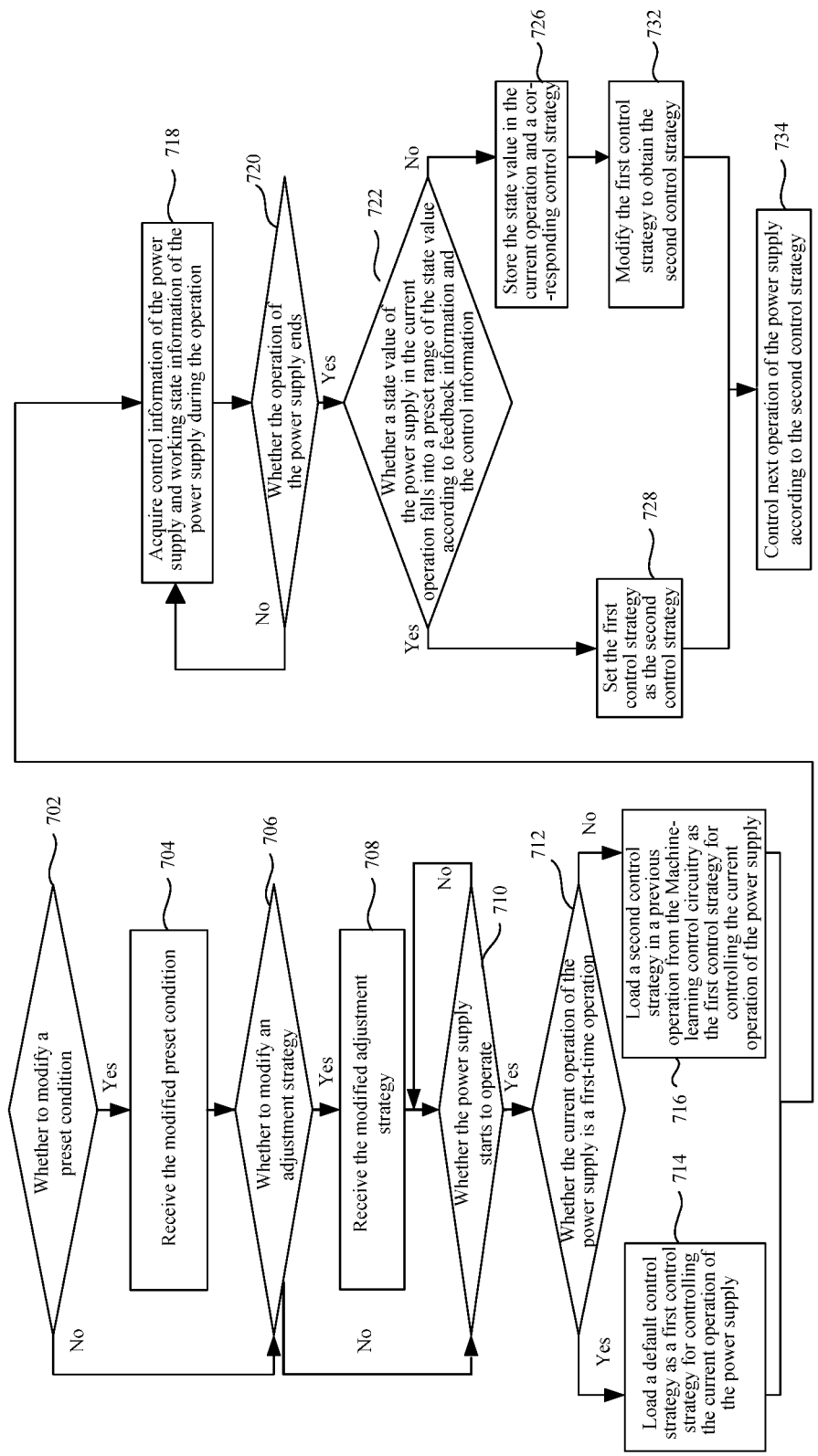
FIG. 7 is a flow chart showing a power supply control method according to an exemplary embodiment of the present disclosure.

As shown in FIG. 7, another exemplary embodiment provides a method for controlling a power supply. The method may include the following steps.

In step 702, it is determined whether to modify a preset condition, if the preset condition is modified, it proceeds to step 704, otherwise, it proceeds to step 706.

In step 704, the modified preset condition is received. The preset condition may be modified via communication or sampling of an external signal.

In step 706, it is determined whether to modify an adjustment strategy, if the adjustment strategy is modified, it proceeds to step 708, otherwise, it proceeds to step 710.

In step 708, the modified adjustment strategy is received. The adjustment strategy may be modified via communication or sampling of an external signal.

In step 710, it is determined whether the power supply starts to operate, if the power supply starts to operate, it proceeds to step 712, otherwise, it is still determined whether the power supply starts to operate.

In step 712, it is determined whether a current operation of the power supply is a first operation, if the current operation is the first operation, it proceeds to step 714, otherwise, it proceeds to step 716.

In step 714, a default control strategy is loaded as the first control strategy for controlling the current operation of the power supply, and the current operation of the power supply is thus controlled according to the first control strategy.

In step 716, a second control strategy in a previous operation is loaded from the machine-learning control circuitry as the first control strategy for controlling the current operation of the power supply, and the current operation of the power supply is thus controlled according to the first control strategy.

In step 718, control information of the power supply and working state information of the power supply during the operation are acquired. The working state information mainly includes an input signal and/or an output signal of the power supply.

In step 720, it is determined whether the operation of the power supply ends, if the operation ends, it proceeds to step 722, otherwise, it returns to step 718.

In step 722, it is determined whether the state value of the power supply in the current operation satisfies the preset condition according to the working state information, if a determination result indicates that the preset condition is not satisfied, it proceeds to step 726, and if the determination result indicates that the preset condition is satisfied, it proceeds to step 728.

In step 726, the state value in the current operation and a corresponding control strategy are stored, then it proceeds to step 732.

In step 732, the first control strategy is modified to obtain the second control strategy, and then it proceeds to step 734.

In step 728, the first control strategy is set as the second control strategy, and then it proceeds to step 734.

In step 734, next operation of the power supply is controlled according to the second control strategy.

In an embodiment, the step 718 further includes acquiring control information for controlling the current operation of the power supply, and the step 722 further includes determining whether the state value of the power supply in the current operation satisfies the preset condition according to the working state information and the control information.

Figure 8:
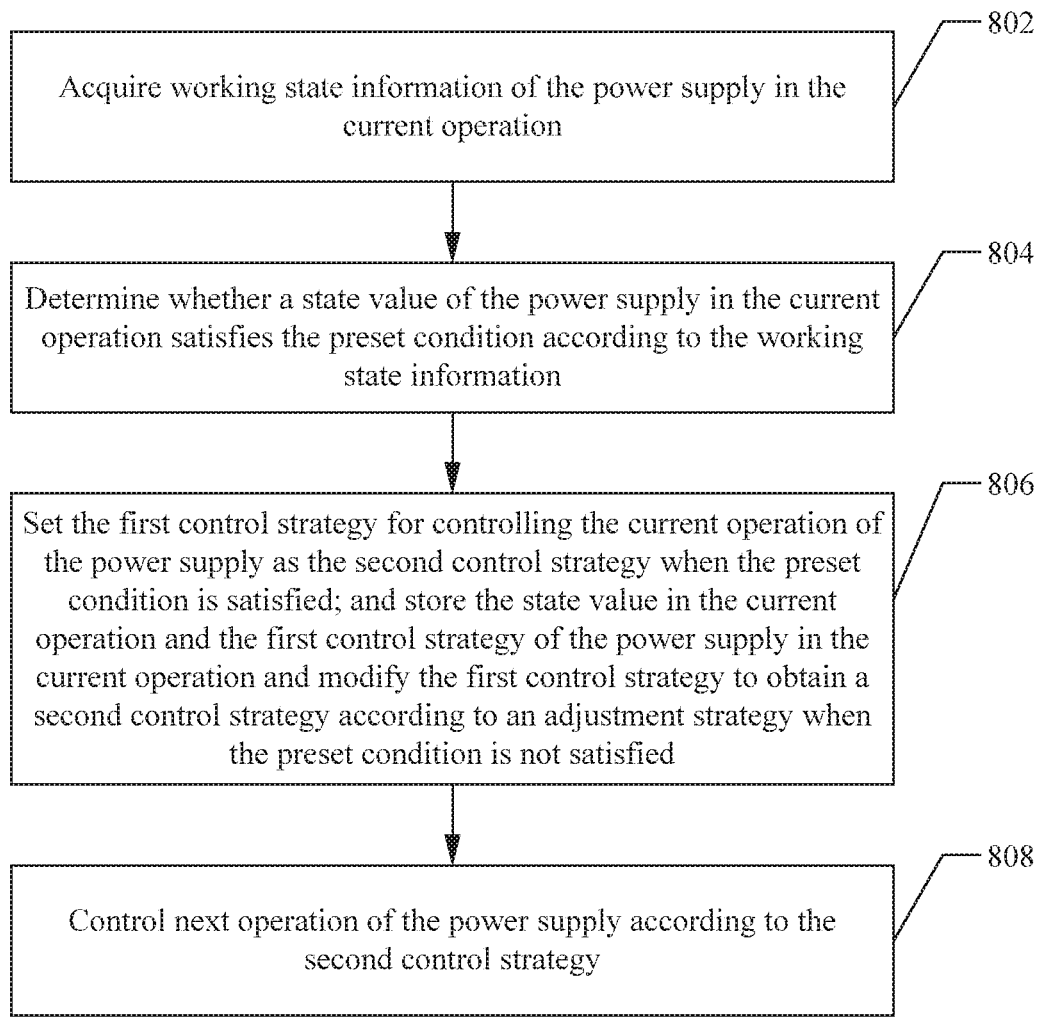
FIG. 8 is a flow chart showing another power supply control method according to an exemplary embodiment of the present disclosure.

As shown in FIG. 8, specific procedures of a method for controlling a power supply performed in the machine-learning control circuitry according to an exemplary embodiment are disclosed. The specific procedures mainly include the following steps.

In step 802, working state information of the power supply in a current operation is acquired.

In step 804, it is determined whether the state value of the power supply in the current operation satisfies a preset condition according to the working state information.

In step 806, if a determination result indicates that the preset condition is satisfied, a first control strategy for controlling the current operation of the power supply is set as a second control strategy, and if the determination result indicates that the preset condition is not satisfied, the state value in the current operation and the first control strategy of the power supply in the current operation are stored, and the first control strategy is modified to obtain a second control strategy according to an adjustment strategy.

In step 808, next operation of the power supply is controlled according to the second control strategy.

The adjustment strategy corresponds to each of control strategies included in the first control strategy. Content of each adjustment strategy includes at least an analysis modification condition, an analysis process under the analysis modification condition and adjustment action information derived from a corresponding analysis result. The control strategy includes one or more of the following: a power supply start-up control strategy, a power supply operation control strategy, a temperature control strategy and a protection control strategy.

In an embodiment, the step 802 further includes acquiring control information for controlling the current operation of the power supply, and the step 804 further includes determining whether the state value of the power supply in the current operation satisfies the preset condition according to the working state information and the control information.

In the step 806, a specific process in which the first control strategy for controlling the current operation of the power supply is modified according to an adjustment strategy includes: comparing the preset condition with the state value in the current operation and determining a difference therebetween, determining a control strategy which needs to be modified based on the difference, and determining a corresponding adjustment strategy according to the control strategy that needs to be modified, and modifying the first control strategy for controlling the current operation of the power supply according to contents of the corresponding adjustment strategy.

Since there are several control strategies, it is required to determine a control strategy that needs to be modified. In the present embodiment, the state value in the current operation is compared with the preset condition, and a parameter of the state value in the operation that differs from the preset condition is determined, thus one or several control strategies needing to be modified can be determined based on the parameter that differs from the preset condition. In this way, the first control strategy for controlling the current operation of the power supply is modified according to contents of the corresponding adjustment strategy.

Further, a specific process in which the control strategy for controlling the current operation of the power supply is modified according to the contents of the corresponding adjustment strategy may include, according to an analysis modification condition in the corresponding adjustment strategy, determining an analysis process under the analysis modification condition and adjustment action information derived from a corresponding analysis result, and then modifying the first control strategy for controlling the current operation of the power supply according to the adjustment action information.

Figure 9:
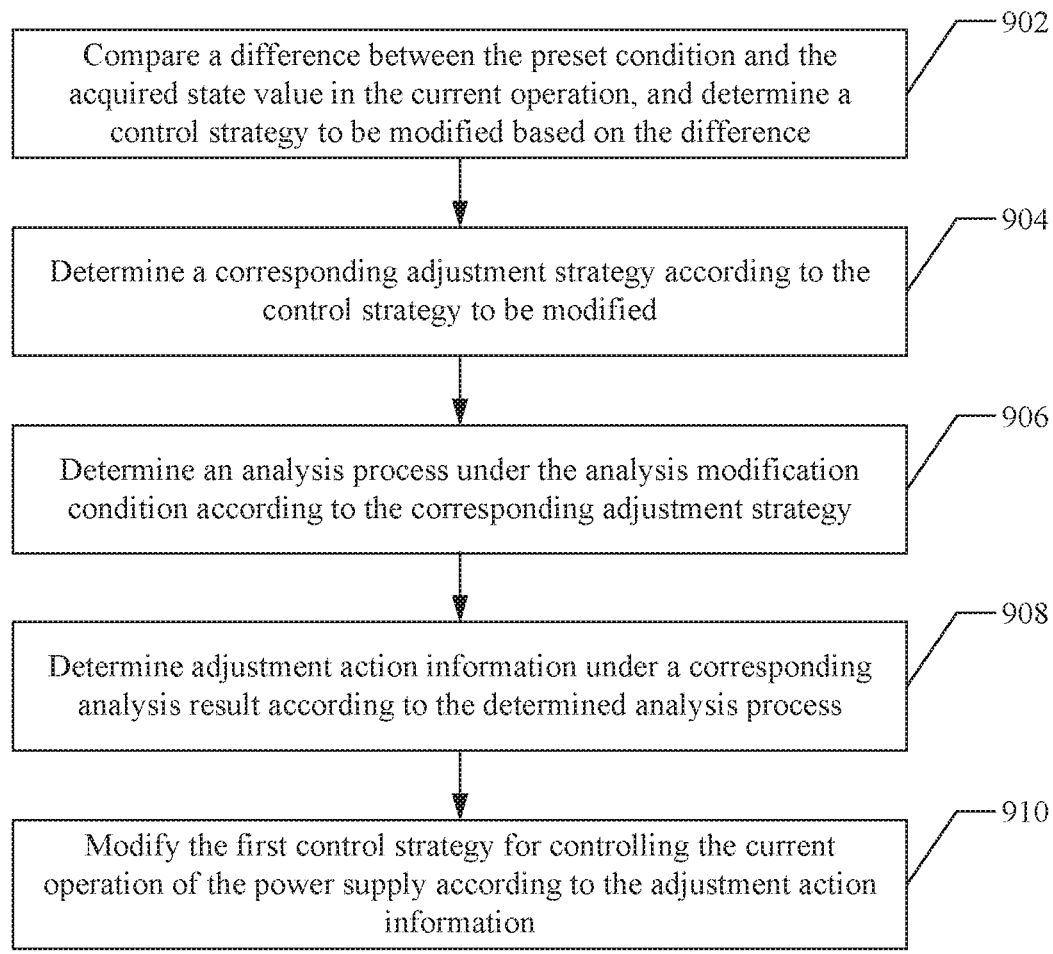
FIG. 9 is a flow chart showing modification of a control strategy according to an adjustment strategy in a power supply control method according to an exemplary embodiment of the present disclosure.

As shown in FIG. 9, procedures for modifying a control strategy according to a corresponding adjustment strategy in an embodiment are disclosed, the procedures may include the following steps.

As shown in FIG. 9, in step 902, the preset condition is compared with the acquired state value in the current operation and a difference therebetween is determined, and a control strategy that needs to be modified is determined based on the difference.

Since there are several control strategies, it is required to determine a control strategy that needs to be modified. In the present embodiment, the state value in the current operation is compared with the preset condition, and a parameter that differs from the preset condition is determined, thus one or several control strategies needing to be modified can be determined based on the difference.

In step 904, a corresponding adjustment strategy is determined according to a control strategy that needs to be modified.

The control strategy includes one or more of the following: a power supply start-up control strategy, a power supply operation control strategy, a temperature control strategy and a protection control strategy. For each of the above control strategies, there is an adjustment strategy corresponding thereto, which indicates that, when timing for making modification under a certain condition is arrived, an analysis process is performed, and then a corresponding adjustment action is performed after determination of an analysis result.

The power supply start-up control strategy mainly includes a strategy for adjusting a rise time, a strategy for reducing overshoot, a strategy for maintaining monotonicity of start-up and the like. According to an adjustment strategy corresponding to the power supply start-up control strategy, the start-up state continuously approaches a desired start-up range by comprehensively analyzing the control information and the working state information in start-up time, such as an output curve, and adjusting a control parameter such as a driving signal, a start-up parameter, and reference parameter.

The power supply operation control strategy mainly includes a strategy for loop control, a strategy for adjusting a sampling frequency, a strategy for setting an adjustment range of the control signal, a strategy for precision control and the like. According to an adjustment strategy corresponding to the power supply operation control strategy, the output signal can be enabled to conform to the desired range by analyzing the control information and a feedback signal such as an input signal and an output signal during the operation, as well as adjusting parameters such as a loop parameter, a reference proportion, the sampling frequency and the adjustment range of the control signal.

The temperature control strategy mainly includes a strategy for heat dissipation control, a strategy for adjusting operation interval and the like. According to an adjustment strategy corresponding to the temperature control strategy, the power supply is operated in a desired temperature environment and performance thereof is maintained stable by acquiring and analyzing a temperature signal of a key component in a system and a signal indicative of heat increased during the operation, as well as adjusting parameters such as a fan rotation speed and the operation interval.

The protection control strategy mainly includes a strategy for protecting voltage, current, temperature and periphery components. According to an adjustment strategy corresponding to the protection control strategy, the protection control strategy of the power supply can be kept accurate and effective by analyzing parameters such as a control parameter, operation time, and an operation parameter when protection is started, as well as adjusting parameters such as a threshold value for protecting, prolonged time, and hysteresis width.

In step 906, according to an analysis modification condition in the corresponding adjustment strategy, an analysis process under the analysis modification condition is determined. The analysis modification condition may be constructed as a timing for analyzing and modifying, for example, when the operation time reaches 1 ms, or when the voltage rises up to 30%. After corresponding analysis timing is arrived, the control information and the working state information are comprehensively analyzed, that is, the analysis process is performed under the analysis modification condition, for example, an output voltage is 10% greater than a desired range, and ripple exceeds 1%.

In step 908, adjustment action information corresponding to the analysis result is determined according to the analysis process obtained in the step 906.

In step 910, the first control strategy for controlling the current operation of the power supply is modified according to the adjustment action information. The control strategy is adjusted with respect to a corresponding analysis result, for example, a driving signal frequency is reduced by 1 kHz, or a loop parameter ratio is increased by 5%.

In addition, if a control strategy satisfying a desired output cannot be obtained based on an existing adjustment strategy, the control strategy that is closest to a desired output range is chosen for controlling the operation of the power supply.

In conclusion, in the power supply control method, the power supply control device, and the power supply control system provided by the exemplary embodiments of the present disclosure, it is determined whether a current operation state is within a desired output range by sampling a feedback signal of a power supply and control information of a control circuitry. If the current operation state is not within the desired output range, a control strategy can be modified according to an adjustment strategy, and an improved control strategy is generated and fed back to the control circuitry. In this way, the control strategy of the power supply can be dynamically adjusted. After a complete learning process, an output of the power supply is always maintained within the desired range. Such a control manner has flexibility and strong applicability. No complex computation is introduced in actual control, thus the control strategy is simplified. A suitable control parameter can be searched out by automatic optimization of the power supply without necessity to set in advance by human. In a case where a tolerance exists in the parameter of the power supply, an optimal operation parameter can be automatically searched out. Moreover, in use of the power supply, such control manner may continuously improve the control parameter by a long-term monitoring, so as to compensate parameter drifts of some parts of the power supply in a long-term work.

The present disclosure has been described with reference to the above related exemplary embodiments, while the above embodiment is only an example of implementing the present disclosure. It should be pointed out that the disclosed embodiment does not limit the scope of the present disclosure. Instead, changes and modifications without departing from the spirit and scope of the present disclosure all belong to the patent protection scope of the present disclosure.

What is claimed is:

1. A method for controlling a power supply, the power supply comprising an execution control circuitry and a machine-learning control circuitry, wherein the method comprises:
    acquiring, by the machine-learning control circuitry, working state information of the power supply in a current operation, the current operation referring to a process from start-up of the power supply to shutdown of the power supply this time;
    determining whether a state value of the power supply in the current operation satisfies a preset condition according to the working state information;
    setting a first control strategy for controlling the current operation of the power supply as a second control strategy when the preset condition is satisfied;
    storing the state value in the current operation and the first control strategy of the power supply in the current operation when the preset condition is not satisfied, and modifying the first control strategy to obtain the second control strategy according to an adjustment strategy;
    loading, by the execution control circuitry, the second control strategy from the machine-learning control circuitry in next operation, and controlling, by the execution control circuitry, the next operation of the power supply according to the second control strategy, the next operation referring to a process from start-up of the power supply to shutdown of the power supply next time; and
    modifying the preset condition by means of communication or via sampling of external signal.

2. The method according to claim 1, further comprising:
    acquiring, by the execution control circuitry, control information for controlling the current operation of the power supply; and
    determining whether the state value of the power supply in the current operation satisfies the preset condition according to the working state information and the control information.

3. The method according to claim 2, wherein the control information comprises at least one of the following: a preset operation parameter, a driving signal change information over time, change information of the power supply state and protection information.

4. The method according to claim 1, wherein the first control strategy comprises at least one control strategy and the adjustment strategy corresponds to each of the at least one control strategy.

5. The method according to claim 4, wherein the modifying the first control strategy to obtain the second control strategy according to an adjustment strategy comprises:
    comparing the preset condition with the state value in the current operation, wherein the state value in the current operation comprising at least one parameter, retrieving a parameter of the state value in the current operation differing from the preset condition, and determining a corresponding adjustment strategy based on the parameter differing from the preset condition; and
    modifying the first control strategy to obtain the second control strategy according to contents of the corresponding adjustment strategy.

6. The method according to claim 5, wherein the modifying the first control strategy for controlling the current operation of the power supply according to the contents of the corresponding adjustment strategy comprises:
    determining, according to an analysis modification condition in the corresponding adjustment strategy, an analysis process under the analysis modification condition and adjustment action information derived from a corresponding analysis result; and
    modifying the first control strategy for controlling the current operation of the power supply according to the adjustment action information.

7. The method according to claim 4, wherein the first control strategy comprises at least one of the following: a power supply start-up control strategy, a power supply operation control strategy, a temperature control strategy and a protection control strategy.

8. The method according to claim 1, wherein the working state information comprises at least one of input signal and output signal of the power supply.

9. The method according to claim 1, prior to the current operation of the power supply, comprising:
    determining whether the current operation of the power supply is the first time;
    loading, by the execution control circuitry, a default control strategy as the first control strategy for controlling the current operation of the power supply when the current operation is the first time, and controlling the current operation of the power supply according to the first control strategy; and
    loading, by the execution control circuitry, the second control strategy in a previous operation from the machine-learning control circuitry as the first control strategy for controlling the current operation of the power supply when the current operation is not the first time, and controlling the current operation of the power supply according to the first control strategy.

10. A device for controlling a power supply, comprising:
    a machine-learning control circuitry comprising an acquisition circuitry configured to acquire working state information of the power supply in a current operation, the current operation referring to a process from start-up of the power supply to shutdown of the power supply this time,
    a first determination circuitry connected to the acquisition circuitry and configured to determine whether a state value of the power supply in the current operation satisfies a preset condition according to the working state information,
    a strategy modification circuitry connected to the first determination circuitry and configured to, when the first determination circuitry determines that the preset condition is satisfied, set a first control strategy for controlling the current operation of the power supply as a second control strategy; and, when the first determination circuitry determines that the preset condition is not satisfied, enable a storage circuitry to store the state value in the current operation and the first control strategy of the power supply in the current operation, and then modify the first control strategy to obtain the second control strategy according to an adjustment strategy, the storage circuitry configured to store the state value in the current operation and the first control strategy of the power supply in the current operation; and an execution control circuitry connected to the strategy modification circuitry and configured to control the current operation of the power supply according to the first control strategy, receive and store the second control strategy from the machine-learning control circuitry in next operation of the power supply, and control the next operation of the power supply according to the second control strategy, the next operation referring to a process from start-up of the power supply to shutdown of the power supply next time;

wherein the acquisition circuitry is further configured to modify the preset condition by means of communication or via sampling of external signal.

11. The device according to claim 10, wherein the acquisition circuitry is further configured to acquire control information for controlling the current operation of the power supply, the first determination circuitry is further configured to determine whether the state value of the power supply in the current operation satisfies the preset condition according to the working state information and the control information, and the control information comprises at least one of the following: a preset operation parameter, a driving signal change information over time, change information of the power supply state and protection information.

12. The device according to claim 10, wherein at least one adjustment strategy is stored in the strategy modification circuitry, the first control strategy comprises at least one control strategy, and the at least one adjustment strategy corresponds to the at least one control strategies.

13. The device according to claim 12, wherein the strategy modification circuitry comprises:

an adjustment strategy determination sub-circuitry configured to compare the preset condition with the state value in the current operation comprising at least one parameter, retrieve a parameter of the state value in the current operation differing from the preset condition, and determine the adjustment strategy based on the parameter differing from the preset condition.

14. The device according to claim 13, wherein the strategy modification circuitry is further configured to modify the first control strategy for controlling the current operation of the power supply according to the determined adjustment strategy.

15. The device according to claim 12, wherein the adjustment strategy comprise at least an analysis modification condition, an analysis process under the analysis modification condition and adjustment action information derived from a corresponding analysis result.

16. The device according to claim 12, wherein the first control strategy comprises at least one of the following: a power supply start-up control strategy, a power supply operation control strategy, a temperature control strategy and a protection strategy.

17. The device according to claim 10, wherein the working state information comprises at least one of input signal and output signal of the power supply.

18. The device according to claim 10, further comprising:
a second determination circuitry connected to the execution control circuitry and configured to determine whether the current operation of the power supply is the first time, notify the execution control circuitry to load a default control strategy as the first control strategy for controlling the current operation of the power supply when the current operation is the first time, and notify the execution control circuitry to load a second control strategy in a previous operation from the machine-learning control circuitry as the first control strategy for controlling the current operation of the power supply when the current operation is not the first time operation, such that the execution control circuitry controls the current operation of the power supply according to the first control strategy.

19. The device according to claim 10, wherein the execution control circuitry comprises a control loop having a feed-forward parameter, the first control strategy is a voltage ripple control strategy, the preset condition is that an output voltage ripple is less than or equal to a first value, and the strategy modification circuitry is further configured to, when the first determination circuitry determines that the preset condition is not satisfied, modify the first control strategy to obtain the second control strategy according to the adjustment strategy comprising:

when the output voltage ripple is greater than a second value greater than the first value, and the output voltage ripple is less than a previous output voltage ripple under the adjustment strategy in a previous operation, increasing the feed-forward parameter by a first step value;

when the output voltage ripple is greater than the first value and smaller than or equal to the second value, and the output voltage ripple is less than the previous output voltage ripple, increasing the feed-forward parameter by a second step value; and when the output voltage ripple is greater than the first value and smaller than or equal to the second value, and the output voltage ripple is larger than the previous output voltage ripple, reducing the feed-forward parameter by a third step value.

20. The device according to claim 10, wherein the execution control circuitry comprises a control loop having at least two loop parameters, the first control strategy is an output voltage start-up control strategy, the preset condition is that a voltage start-up process is monotonous and a start-up time is less than or equal to a preset value, and the strategy modification circuitry is further configured to, when the first determination circuitry determines that the preset condition is not satisfied, modify the first control strategy to obtain the second control strategy according to the adjustment strategy comprising:

when the start-up process is not monotonous, reducing the at least two loop parameters by a first step value;

when the start-up process is monotonous and the start-up time is greater than the preset value, increasing one of the at least two loop parameters by a second step value.

\* \* \* \* \*